United States Patent [19]

Quinton

[11] 4,157,478
[45] Jun. 5, 1979

[54] AUTOMOBILE THEFT PREVENTION SYSTEM

[76] Inventor: Richard J. Quinton, 6911 Chippewa St., St. Louis, Mo. 63109

[21] Appl. No.: 824,633

[22] Filed: Aug. 15, 1977

[51] Int. Cl.² .................... H02J 13/00; B60R 25/04
[52] U.S. Cl. .................... 307/10 AT; 123/146.5 B; 200/44; 340/64
[58] Field of Search ............ 307/10 AT; 123/146.5 B, 123/198 B; 70/237; 200/44, 45; 340/63, 64; 361/189, 190

[56] References Cited

U.S. PATENT DOCUMENTS

| 2,647,937 | 8/1953 | Baumann | 123/146.5 B |
| 3,735,833 | 5/1973 | Sutkowski | 307/10 AT |
| 3,787,812 | 1/1974 | Armstrong | 200/44 |
| 3,903,986 | 9/1975 | Smith | 340/64 |

Primary Examiner—L. T. Hix
Assistant Examiner—S. D. Schreyer
Attorney, Agent, or Firm—Cohn, Powell & Hind

[57] ABSTRACT

An automobile theft prevention system in which an electrical ignition circuit includes a switch mechanism for opening and closing the circuit, and a switch-actuating mechanism that interconnects an ignition lock with the switch mechanism for closing the circuit when a first set of selected cams of the ignition lock are rotated, and for opening the circuit when any one of a second set of selected cams of the ignition lock is rotated. The switch-actuating mechanism includes a first set of flexible cables connecting the switch mechanism with a first set of selected cams, and a second set of flexible cables connecting the switch mechanism with a second set of selected cams. The system further has a hood lock mechanism including a hood lock. The switch-actuating mechanism interconnects the ignition lock and the hood lock mechanism for enabling the opening of the hood lock when the first set of selected cams are rotated and precludes opening of the hood lock when any one of the second set of selected cams is rotated.

7 Claims, 13 Drawing Figures

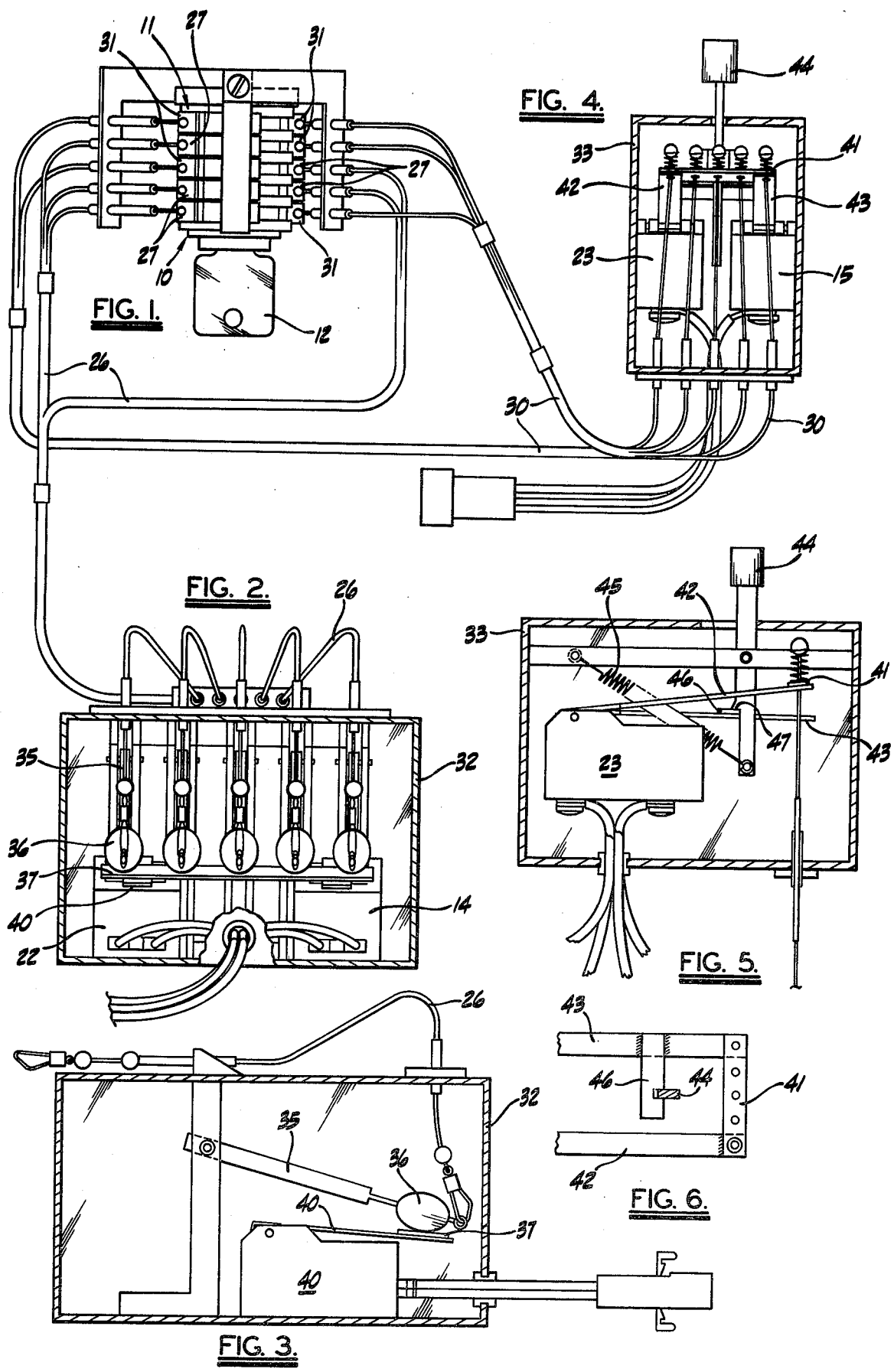

AUTOMOBILE THEFT PREVENTION SYSTEM

BACKGROUND OF THE INVENTION

This invention relates generally to an automobile theft prevention system, and more particularly to an improved system that precludes energization of the ignition circuit except by an authorized person having an appropriate ignition key.

There are several prior electronic systems designed to prevent theft of automobiles. Most of these systems incorporate a hood lock and an ignition lock. Some of the systems require a particular arrangement of an ignition switch, relay and latching circuit and voltage regulator. Other systems require plates with particular printed circuits before the ignition can be energized. However, these heretofore conventional systems are expensive and complicated in assembly.

SUMMARY OF THE INVENTION

The present automobile theft prevention system is simple in construction and operation, and is relatively inexpensive. It utilizes flexible push-pull cables between the ignition lock and the operating control switches.

In the system, the electrical ignition circuit includes a switch means interconnected to the ignition lock by switch-actuating means by closing the circuit when a first set of selected cams of the ignition lock are rotated, and for opening the circuit when any one of a second set of selected cams of the ignition lock is rotated.

More particularly, the switch-actuating means of the system includes a first set of flexible cables interconnecting the switch means with the first set of selected cams, and a second set of flexible cables connecting the switch means with the second set of selected cams.

Further, the switch-actuating means includes first elements associated with the switch means and connected to the first set of selected cams for closing the circuit when all said first elements are in one position, and opening the circuit when any one of said first elements is out of said one position, and includes a second element associated with the switch means and connected to the second set of selected cams for opening the circuit when in one position, and closing the circuit when out of said one position.

In the switch-actuating means, the first set of flexible cables interconnect the said first elements with the first set of selected cams for moving said first elements to said one position upon rotation of the first set of cams, and the second set of flexible cables interconnect the said second element with the second set of selected cams for moving the said second element to said one position upon rotation of any one of the second set of cams.

The system can also include a hood lock means including a hood lock. The switch-actuating means interconnects the ignition lock and the hood lock means for enabling opening of the hood lock when the first set of selected cams are rotated, and for precluding opening of the hood lock when any one of the second set of selected cams is rotated.

A latch means is associated with the switch means in the ignition circuit for precluding closing of the ignition circuit when the circuit has been opened by rotation of any one of the second set of selected cams. The latch means can be manually reset to allow closing of the ignition circuit upon subsequent actuation of the switch means in the ignition circuit upon rotation of the first set of selected cams.

In one embodiment, the hood lock means includes an electrical hood lock circuit including a hood lock solenoid and a switch means for opening and closing the hood lock circuit. The switch-actuating means interconnects the ignition lock and the switch means of the electrical hood lock circuit closing the circuit when the first set of selected cams are rotated and for opening the hood lock circuit when any one of the second set of selected cams is rotated.

BRIEF DESCRIPTION OF THE DRAWINGS

FIG. 1 is a top plan view of the ignition lock and the connection of the flexible cables;

FIG. 2 is a front elevational view of the unit having the said first elements and switch means, and the connection with the flexible cables;

FIG. 3 is a side elevational view of the unit of FIG. 2;

FIG. 4 is a front elevational view of the unit having the said second element and switch means, and the connection to the flexible cables;

FIG. 5 is a side elevational view of the unit in FIG. 4;

FIG. 6 is a fragmentary top plan view of the said second element shown in FIGS. 4 and 5;

DESCRIPTION OF THE PREFERRED EMBODIMENT

Figure 9:
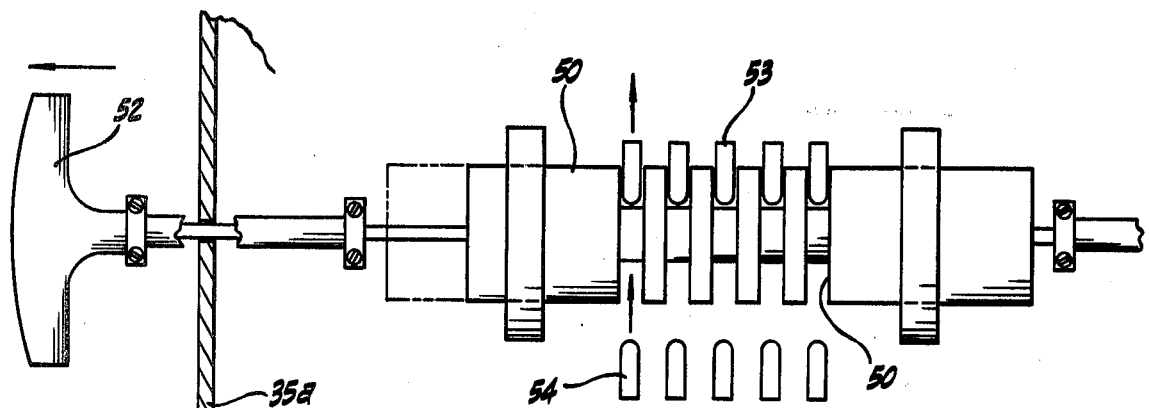
FIG. 9 is a fragmentary diagrammatic view showing the hood lock mechanism in another embodiment of the system.

Referring now by characters of reference to the drawing, it will be understood that the automobile theft prevention system includes an ignition lock indicated by 10 having a plurality of cams referred to by 11 individually rotated by an ignition key 12.

An electrical ignition circuit referred to by 13 includes a switch means having a first switch 14 and a second switch 15, the ignition circuit being connected to a battery 16 and ignition coil 17 that is operatively connected to a distributor (not shown) in the conventional manner.

A hood lock means includes an electrical hood lock circuit referred to by 20 having a hood lock solenoid 21 that operates a hood lock (not shown) in the conventional manner. The hood lock circuit is connected to the battery 16 also. The hood lock circuit 20 includes a first switch 22 and a second switch 23. A manual switch 24 is in the hood lock circuit 20 to keep the hood lock solenoid 21 from being on constantly, and can be "jumped" in the event the battery 16 becomes dead. This manually-operated switch 24 should be mounted on the dash for convenience.

Switch-actuating means indicated by 25 operatively interconnect the ignition lock 10 and the switch means 14, 15, 22 and 23. The switch-actuating means 25 includes a first set of flexible push-pull cables 26 operatively connecting the first switches 14 and 22 of the switch means with a first set of selected cams 27. A second set of flexible push-pull cables 30 operatively connect the second switches 15 and 23 of the switch means with a second set of selected cams 31. The ignition lock 10 is located preferably on the dash in the interior of the car while the units 32 and 33 containing the switch means are located under the hood, the flexible cables 26 and 30 extending through a conduit 34 in the fire wall 35 of the automobile.

The flexible cables 26 are attached to the ends of arms 35 pivotally mounted in the unit 32 containing the first switches 14 and 22 of the switch means. In the preferred embodiment, there are five pivoted arms 35 and five flexible cables 26. Each arm 35 is provided with a weight 36 at the end adapted to seat on a cross bar 37 interconnecting the switch arms 40 of first switches 14 and 22. The weights 36 provide sufficient load on the switch arms 40 to hold them in a depressed or open circuit condition when any one of the weights 36 seats on the cross bar 37. The arms 35 and weights 36 constitute first elements. When the first set of selected cams 27 are rotated, the flexible cables 26 will lift all of the pivoted arms 35 to one position to close the first switches 14 and 22 of the switch means.

The flexible cables 30 are connected to the transverse portion 41, constituting a second element, attached to the end of switch arm 42 of the first switch 23 of the switch means in the unit 33. The transverse said second element 41 overlies and engages the switch arm 43 of the second switch 15 of the switch means in the ignition circuit. If any one of the second set of cams 31 is rotated, the associated flexible cable 30 moves the switch arms 42 and 43 of switches 23 and 15 respectively to one position whereby to open the ignition circuit 13 and to open the hood lock circuit 20. When the hood lock circuit 20 is energized, the solenoid 21 acts to unlock the hood lock.

A latch means includes a latch arm 44 pivotally mounted to the unit 33 and urged pivotally in one direction by a spring 45. The switch arm 43 includes a transverse catch bar 46 that moves underneath a keeper shoulder 47 of the latch arm 44 when the switch arms 42-43 are pulled down by any one of the flexible cables 30. When the force exerted by any one of the flexible cables 30 is removed, the switch arm 42 will move upwardly to a position to close the switch 23 and hence close the hood lock circuit 20. The latch arm 44 will keep the switch arm 43 locked in position whereby the switch 15 maintains the ignition circuit 13 open.

Subsequently, when the appropriate correct key is inserted into the ignition lock 10 and rotated, the first set of selected cams 27 will rotate and act through the first set of flexible cables 26 to close the first switches 14 and 22 of the switch means and thereby close the hood lock circuit 20, allowing the hood to be raised and the latch arm 44 reset to release the switch arm 43 and allow the second switch 15 to close the ignition circuit 13. In usage, the correct ignition key will turn all of the cams 27 and act through the flexible cables 26 to close the first switch 14 and thereby close the electrical ignition circuit 13, the second switch 15 being in a normally closed position. The engine will then be started. The correct ignition key will not turn any of the cams 31, and accordingly, the closed condition of the second switch 15 will not be affected.

When an incorrect key is inserted into the ignition lock 10, such key will probably not turn at least one of the cams 27 and will probably turn at least one of the cams 31. Accordingly, either of the first and second switches 14 and 15 will be open, and the ignition circuit 13 will be open so as to preclude starting of the engine. In order to condition the switches 14-15 properly for engine operation, all of the cams 27 must be rotated and the associated cables 26 pulled, and none of the cams 31 rotated and none of the associated cables 30 pulled.

When an incorrect key has been used in an attempt to operate the engine and the incorrect key is removed, the latch arm 44 will preclude the switch 15 from closing the ignition circuit 13, but the switch 23 will close the hood lock circuit 20. Then, when the correct key is used subsequently, the switches 14 and 22 will be closed, thus closing the hood lock circuit 20. However, the ignition circuit 13 will still be open. Now, the hood can be opened and the latch 44 reset to close the switch 15 in the ignition circuit. The ignition circuit 13 can then be energized by the correct key.

Figure 10:
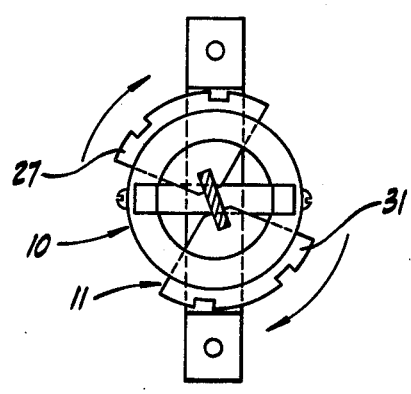
FIG. 10 is an end view of the hood lock cylinder and cooperating said first and second elements shown in FIG. 9.
Figure 7:
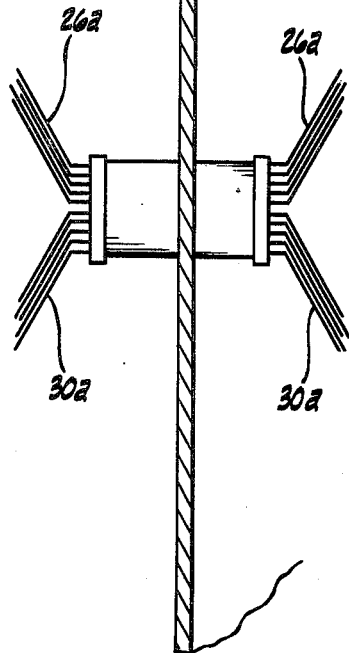
FIG. 7 is a cross section of the ignition lock.
Figure 8:
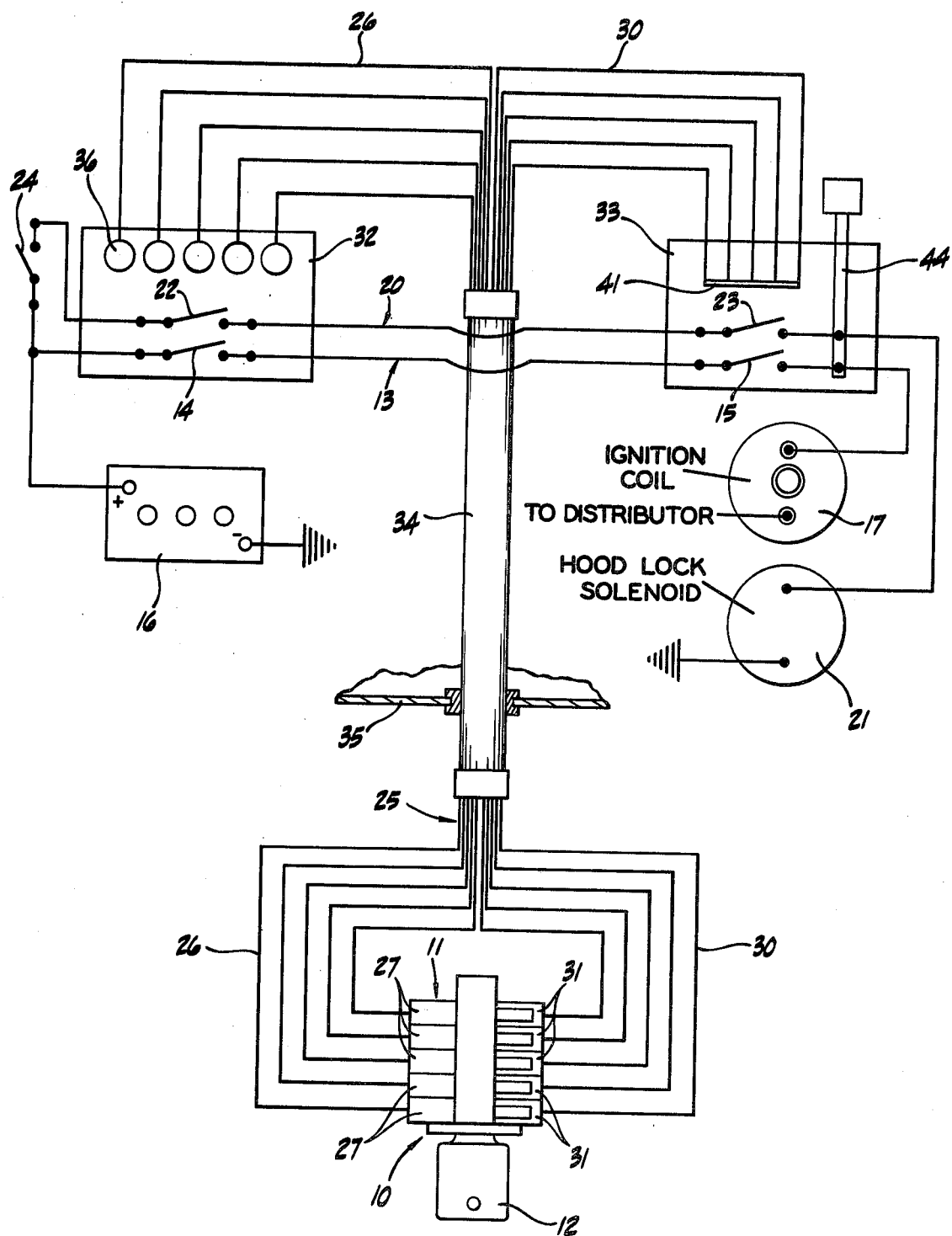
FIG. 8 is a schematic diagram of the system disclosed in FIGS. 1–7.
Figure 13:
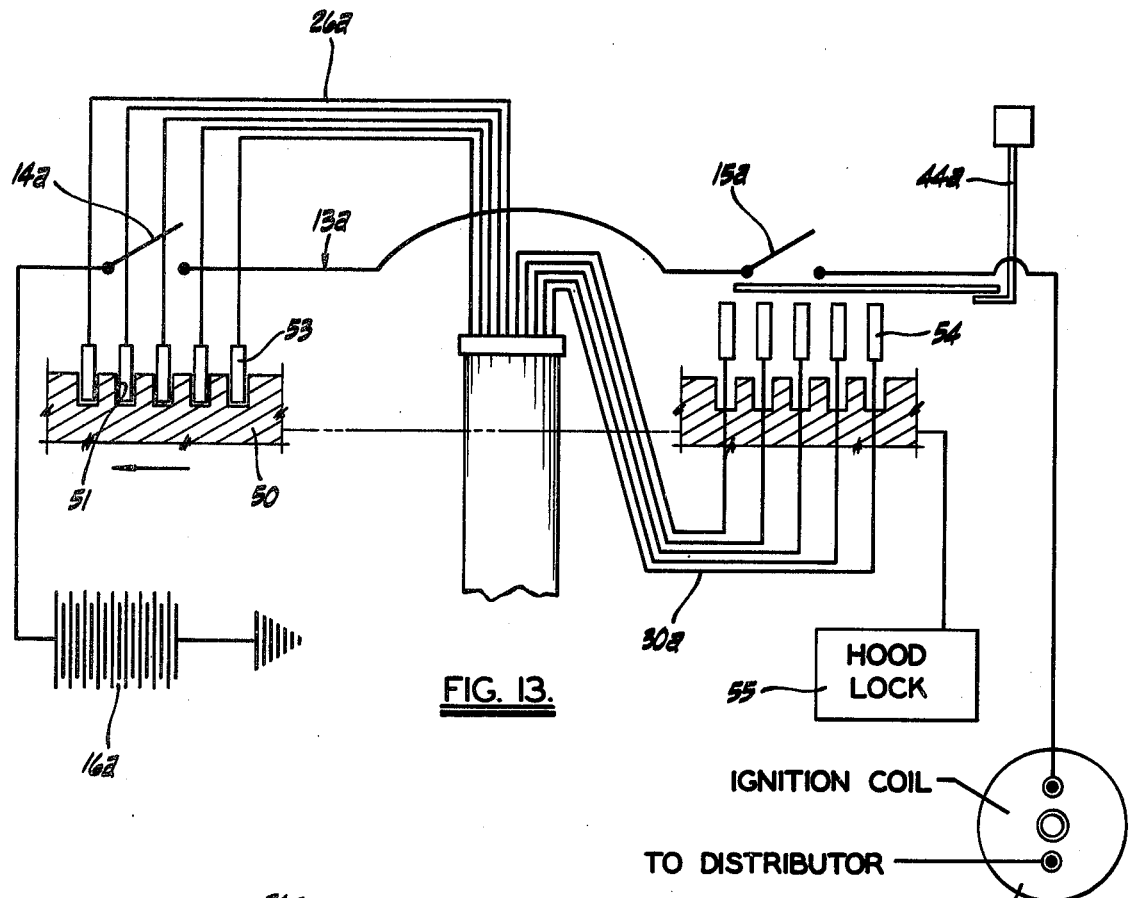
FIG. 13 is a schematic diagram of the system disclosed in FIGS. 9–12.
Figure 11:
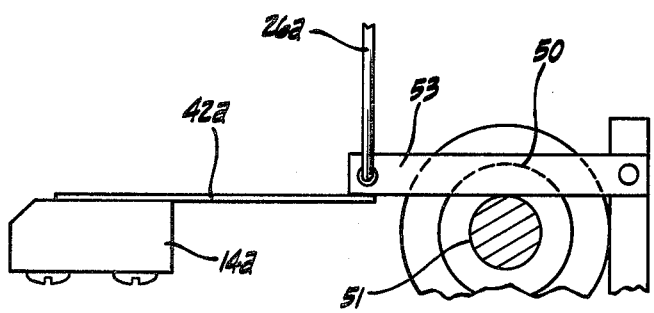
FIG. 11 is a fragmentary end view of one side of the hood lock cylinder and its connection to the said first elements and switch means.
Figure 12:
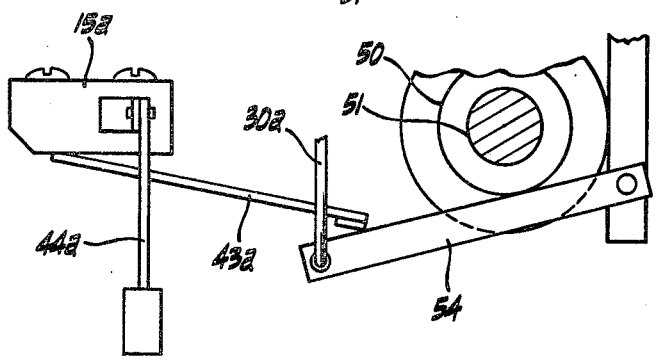
FIG. 12 is a fragmentary end view of the other side of the hood lock cylinder and its connection to the said second elements and switch means.

Another embodiment of the invention is disclosed in FIG. 9-13. In this embodiment, the same ignition lock 10 with its rotative cams 11 and ignition key 12 are utilized, the ignition lock 10 being located preferably on the dash for convenience. The electrical ignition circuit 13a includes a switch means having first switch 14a and a second switch 15a, the circuit 13a being connected to battery 16a and ignition coil 17a.

The hood lock means includes a cylinder 50 having a plurality of annular grooves 51, i.e., five such grooves 51 being shown. The cylinder 50 is manually actuated by handle 52 located in the driver compartment on one side of the fire wall 35a, the cylinder 50 being located under the hood at the other side of the fire wall 35a. A suitable hood lock is attached to the cylinder 50 and is actuated to lock and unlock the hood.

The switch-actuating means includes a plurality of pivoted arms 53, constituting first elements, at one side of the cylinder 50 and adapted to selectively interfit the annular grooves 51. A first set of flexible push-pull cables 26a operatively interconnect the ignition lock 10 with the cylinder 50 and the switch 14a of the ignition circuit selectively through the pivoted arms 53, the flexible cables 26a being attached to the first set of rotative lock cams 27.

The switch actuating means also includes a plurality of pivoted arms 54, constituting second elements, at the other side of the cylinder 50 and selectively interfitting the annular grooves 51. A second set of flexible push-pull cables 30a operatively interconnect the ignition lock 10 with the cylinder 50 and with the second switch 15a of the ignition circuit 13a through the pivoted arms 54, the flexible cables 30a being attached to the arms 54 and to the second set of rotative cams 31 of the ignition lock 10.

A latch means is associated with the second switch 15a to preclude closing of the ignition circuit 13a once the switch 15a has been opened upon actuation of any one of the pivoted arms 54 by rotation of any one of the cams 31 by use of an incorrect key. The latch means consists of a pivoted latch arm 44a that engages the switch arm 43a of the second switch 15a in the ignition circuit 13a. Upon subsequent actuation of the pivoted arms 53 by using a correct key, which causes rotation of all lock cams 27, the pivoted arms 53 acting under the action of flexible cables 26a will move the switch arm 42a to close the first switch 14a and the ignition circuit 13a, thereby allowing manual actuation of the hood lock cylinder 50 by handle 52 so as to open the hood, and hence allow the user to reset the latch arm 44a and thereby close the second switch 15a and the ignition circuit 13a.

In operation, the pivoted switch arms 53 are normally maintained in the cylinder grooves 51 and engage the switch arm 42a to open the switch 14a and the ignition circuit 13a. In order to close the first switch 14a and the ignition circuit 13a, all of the pivoted arms 53 must be moved by flexible cables 26a to one position out of the cylinder grooves 51 to allow the switch arm 42a to close the switch 14a. The pivoted arms 54 are normally in a position engaging the switch arm 43a to close the second switch 15a and the ignition circuit 13a, and disengaging the annular cylinder grooves 51.

When a correct key is inserted into the ignition lock 10, the first set of pre-selected cams 27 will be rotated and will act through the first set of flexible cables 26a to move the pivoted arms 53 out of the cylinder grooves 51 and allow the switch arms 42a to close the first switch 14a and the ignition circuit 13a. None of the second set of pre-selected cams 31 will be rotated, and therefore the associated second switch 15a will remain closed. The engine will then be started.

When a wrong key is inserted into the ignition lock, such key will probably not turn at least one of the first set of selected cams 27, and will probably turn at least one of the second set of selected cams 31. Therefore, either the first switch 14a or the second switch 15a will be opened and the ignition circuit 13a will be opened, and the engine will not start. In order to condition the first and second switches 14a and 15a for engine operation, all of the flexible cables 26a must be pulled and none of the flexible cables 30a must be pulled.

When a wrong key has been used in an attempt to operate the engine, and the wrong key is removed, the latch arm 44a will prevent the second switch 15a from closing the ignition circuit 13a. However, the pivoted arms 54 will be moved out of the cylinder grooves 51. Then, when the right key is used subsequently, the first switch 14a will be closed and the associated pivoted arms 53 will be moved out of the cylinder grooves 51. The lock cylinder 50 can then be moved longitudinally axially by the handle 52 to unlock the hood lock and allow the hood to be raised so that the latch arm 44a can be reset and allow the associated second switch 15a to close the ignition circuit. The ignition circuit can then be energized by the right key.

I claim as my invention:

1. An automobile theft prevention system, including:
   (a) an ignition lock including a plurality of cams mounted for individual rotation,
   (b) an electrical ignition circuit including a switch means located remotely from the cams for opening and closing the circuit, and
   (c) switch-actuating means interconnecting the ignition lock and switch means for closing the circuit when a first set of selected cams are rotated, and for opening the circuit when any one of a second set of selected cams is rotated, the switch-actuating means including:
      (1) a first set of flexible push-pull cables connecting the switch means with the first set of selected cams,
      (2) a second set of flexible push-pull cables connecting the switch means with the second set of selected cams, and
      (3) the flexible push-pull cables being attached to the associated cams.

2. An automobile theft prevention system as defined in claim 1, in which:
   (d) the switch-actuating means includes:
      (1) first elements associated with the switch means for closing the ignition circuit when all said first elements are in one position, and opening the circuit when any one of the said first elements is out of said one position,
      (2) the first set of flexible push-pull cables being attached to the said first elements and being attached to the first set of selected cams for moving said first elements to said one position upon rotation of the first set of cams,
      (3) a second element associated with the switch means for opening the ignition circuit when in one position and closing the circuit when out of said one position, and
      (4) the second set of flexible push-pull cables being attached to the said second element and being attached to the second set of selected cams for moving the said second element to said one position upon rotation of any one of said second set of cams.

3. An automobile theft prevention system as defined in claim 1, in which:
   (d) an electrical hood lock circuit includes a switch means located remotely from the cams for opening and closing the circuit,
   (e) the first set of flexible push-pull cables are connected to the switch means of the electrical hood lock circuit for closing the circuit when the first set of selected cams are rotated, and the second set of flexible push-pull cables are connected to the switch means of the hood lock circuit for opening the circuit when any one of the second set of selected cams is rotated, and
   (f) latch means is associated with the switch means in the ignition circuit for precluding closing of the ignition circuit when the circuit has been opened by rotation of any one of the second set of selected cams.

4. An automobile theft prevention system as defined in claim 1, in which:
   (d) an electrical hood lock circuit includes a hood lock solenoid and a switch means located remotely from the cams for opening and closing the circuit,
   (e) the first set of flexible push-pull cables are connected to the switch means of the electrical hood lock circuit for closing the circuit when the first set of selected cams are rotated, and the second set of flexible push-pull cables are connected to the switch of the hood lock circuit for opening the circuit when any one of the second set of selected cams is rotated, and
   (f) latch means is associated with the switch means in the ignition circuit for precluding closing of the ignition circuit when the circuit has been opened by rotation of any one of the second set of selected cams, the latch means requiring manual reset to enable closing of the ignition circuit upon subsequent actuation of the switch means in the ignition circuit upon rotation of the first set of selected cams.

5. An automobile theft prevention system as defined in claim 4, in which:
(g) the switch-actuating means includes:
  (1) first elements associated with the switch means of the ignition circuit and with the switch means of the hood lock circuit for closing the ignition circuit and the hood lock circuit when all said first elements are in one position, and opening the ignition circuit and hood lock circuit when any one of said first elements is out of said one position,
  (2) the first set of flexible push-pull cables being attached to the said first elements and being attached to the first set of selected cams for moving said first elements to said one position upon rotation of the first set of cams,
  (3) a second element associated with the switch means of the ignition circuit and with the switch means of the hood lock circuit for opening the ignition circuit and the hood lock circuit when in one position, and closing the ignition circuit and the hood lock circuit when out of said one position, and
  (4) the second set of flexible push-pull cables being attached to the said second element and being attached to the second set of selected cams for moving the said second element to said one position upon rotation of any one of the second set of cams.

6. An automobile theft prevention system as defined in claim 1, in which:
(d) a hood lock means includes a hood lock,
(e) the switch-actuating means includes:
  (1) first elements associated with the switch means for closing the ignition circuit when all said first elements are in one position, and opening the ignition circuit when any one of the said first elements is out of said one position, and associated with the hood lock means for enabling opening of the hood lock when all said first elements are in one position, and precluding opening of the hood lock when any one of the said first elements is out of said one position,
(f) the first set of flexible push-pull cables are attached to said first elements and are attached to the first set of selected cams for moving said first elements to said one position upon rotation of the first set of cams,
(g) a second element associated with the switch means for opening the ignition circuit when in one position, and closing the circuit when out of said one position, and associated with the hood lock means for precluding opening of the hood lock when in one position, and for enabling opening of the hood lock when out of said one position, and
(h) the second set of flexible push-pull cables are attached to the said second element and are attached to the second set of selected cams for moving the said second element to said one position upon rotation of any one of the second set of cams.

7. An automobile theft prevention system as defined in claim 6, in which:
(i) latch means is associated with the switch means in the ignition circuit for precluding closing of the ignition circuit when the circuit has been opened by rotation by any one of the second set of selected cams, the latch means requiring reset to enable closing of the ignition circuit upon subsequent actuation of the switch means in the ignition circuit upon rotation of the first set of selected cams.

* * * * *